United States Patent [19]
Creswell et al.

[11] Patent Number: 5,544,229
[45] Date of Patent: Aug. 6, 1996

[54] SYSTEM FOR PROVIDING PERSONALIZED TELEPHONE CALLING FEATURES

[75] Inventors: Carroll W. Creswell, Basking Ridge; Steven G. Lanning, Gillette; Carol J. Papazian, Bridgewater; James M. Rulon, Randolph, all of N.J.

[73] Assignee: AT&T Corp., Murray Hill, N.J.

[21] Appl. No.: 376,501

[22] Filed: Jan. 23, 1995

Related U.S. Application Data

[63] Continuation of Ser. No. 905,265, Jun. 26, 1992, Pat. No. 5,384,831, which is a continuation-in-part of Ser. No. 754,109, Sep. 3, 1991, Pat. No. 5,222,125.

[51] Int. Cl.⁶ .............................. H04M 3/42; H04M 1/64
[52] U.S. Cl. ........................ 379/67; 379/100; 379/211; 379/112
[58] Field of Search ................... 379/67, 88, 89, 379/201, 207, 211, 112, 114, 127, 100, 91, 94

[56] References Cited

U.S. PATENT DOCUMENTS

| | | | |
|---|---|---|---|
| 4,313,035 | 1/1982 | Jordan et al. | 179/18 |
| 4,878,240 | 10/1989 | Lin et al. | 379/67 |
| 4,893,335 | 1/1990 | Fuller et al. | 379/200 |
| 4,942,598 | 7/1990 | Davis | 379/211 |
| 5,222,120 | 6/1993 | McLeod et al. | 379/89 |
| 5,329,578 | 7/1994 | Brennan et al. | 379/89 |

FOREIGN PATENT DOCUMENTS 9006729  5/1991  WIPO ...................... H04M 11/00

Primary Examiner—Jeffery Hofsass
Assistant Examiner—Fan Tsang
Attorney, Agent, or Firm—Frederick B. Luludis

[57] ABSTRACT

A common adjunct switch in association with a communications network provides a number of functionalities, one of which allows associated subscribers to customize the way in which they receive telephone calls and access enhanced services, such as a facsimile service. In particular, each subscriber may dynamically specify a number of caller identifiers and a different call treatment for each such identifier as well as a particular billing mode. A call treatment may include, for example, a specification to forward an associated call to a (a) particular telephone number, (b) default telephone number, or (c) messaging service.

2 Claims, 8 Drawing Sheets

FIG. 2
| SEC.CODE | SUB.PIN | DFLT.SVC | PHONE.NUM |
|---|---|---|---|
| NU | HOME.PHONE | SUB.LANG | M.MASK |
| NU.GT | NUM.MSG | NUM.CIN | NU |
| NU | CFNUM.3 | CFNUM.2 | CFNUM.1 |
| CIN.4 | CIN.3 | CIN.2 | CIN.1 |
| SCIN.4 | SCIN.3 | SCIN.2 | SCIN.1 |
| LNK.REC | MED.PTR | CW | PA.CALL |
300, 301, 302, 303, 304
FIG. 3
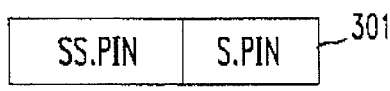
| SS.PIN | S.PIN |
|---|---|
301
FIG. 4
| CF.NUM | CF.DUR | CF.TIME |
|---|---|---|
302
FIG. 5
| CIN.NUM | CIN.NAME | CIN.GTNG | CT.1 | CT.2 | CT.3 | CT.4 |
|---|---|---|---|---|---|---|
303
FIG. 6
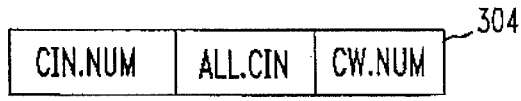
| CIN.NUM | ALL.CIN | CW.NUM |
|---|---|---|
304

FIG. 7

| CALL TREATMENT | CALL TREATMENT CODE |
|---|---|
| HOME PHONE NO. | *1 |
| CALL FORWARD NO. 1 | *2 |
| CALL FORWARD NO. 2 | *3 |
| CALL FORWARD NO. 3 | *4 |
| VOICE MESSAGE SVC. | *5 |
| NOT AVAILABLE | *6 |
| FAX | *7 |

FIG. 8

| CSTEL.NUM | ALL.CIN | CF.CIN1 | CF.CIN2 | CF.CIN3 |
|---|---|---|---|---|

5,544,229

SYSTEM FOR PROVIDING PERSONALIZED TELEPHONE CALLING FEATURES

This is a continuation of application Ser. No. 07/905,265 filed Jun. 26, 1992, now U.S. Pat. No. 5,384,831 which is a continuation-in-part of U.S. patent application Ser. No. 754,109 filed Sep. 3, 1991, now U.S. Pat. No. 5,222,125.

FIELD OF THE INVENTION

The invention relates to public switched telephone systems, and more particularly, relates to a public switched telephone network adapted to provide a common platform for the provision of customer controlled features.

BACKGROUND OF THE INVENTION

Various types of so-called customer provided equipment, such as Private Branch Exchanges (PBXs), provide a number of call processing options which allow business employees to customize the way in which they receive and establish telephone calls. For example, a business employee operating his/her business telephone station set may program an associated PBX so that the PBX (a) forwards to another business telephone station set that is served by the same PBX telephone calls directed to the employee's business telephone station set; (b) establishes a so-called conference connection; or (c) transfers an incoming call to another business telephone station set also served by the same PBX. Unfortunately, such employees do not enjoy all such telephone call capabilities in conjunction with using their home telephone station sets. At most, such employees, including other telephone subscribers, may subscribe to a few telephone services that are typically offered by their respective local exchange carriers. Such services include, for example, a voice mail message service, call waiting service and the aforementioned call forwarding service. However, one limitation associated with locally offered services, e.g., call forwarding, is that, typically, they can only be programmed from the subscriber's home telephone station set or a telephone station set located within the area served by the offering local exchange carrier.

It is often the case that a telephone subscriber who is at a distant location needs to place a long distance telephone call to his/her home telephone station set or to another telephone station set. As is well-known, such a person may place a log distance telephone call from a so-called coin telephone station set. However, to do so, a prescribed amount of money needs to be inserted in the coin telephone to cover the cost of the long distance call for an initial predetermined calling period. As is also well-known, a long distance call may be extended beyond the initial calling period only if additional money is inserted in the coin telephone. The burden associated with placing a long distance telephone call via a coin telephone station may be dealt with by placing such a call through a so-called long distance telephone operator. In such an instance, the cost of the long distance call may be charged to a credit card acceptable to the long distance carrier or "reversed" to the called telephone station. It can be appreciated that in the first instance, the calling subscriber must accept the burden associated with maintaining a credit card acceptable to the long distance carrier. It can also be appreciated that in the second instance the called party may not accept the charges for the long distance call.

SUMMARY OF THE INVENTION

An advance in the art of telephone switching systems is achieved by disposing in a telecommunications system an adjunct operative for providing personal telecommunications services such that a subscriber, in accord with an aspect of the invention, may associate different call identifiers with different specifications defining respective call treatments. In an illustrative embodiment of the invention, such call treatments are specified by the subscriber and may include forwarding a telephone call associated with a call identifier to one of a number of different destinations.

In accord with another aspect of the invention, the subscriber may also associate different billing modes with different call identifiers such that the originator of a call associated with a first type of identifier pays for the call, whereas the subscriber pays for a call associated with a second type of call identifier. In accord with another aspect of the invention, the first and second types of call identifiers are distinguished from one another by the number of digits forming those call identifiers. That is, the first and second types of call identifiers are formed from a first and second number of digits, respectively. In an illustrative embodiment of the invention, the first and second number of digits may be, for example, three and four digits, respectively.

BRIEF DESCRIPTION OF THE DRAWING

The operation of these and other aspects of the claimed invention will become more apparent and better understood by referring to the following detailed description in conjunction with the drawing in which:

FIG. 2 is an illustrative example of a record associated with a telephone subscriber whose has subscribed to the inventive service;

FIGS. 3–6 show expanded versions of respective fields of the record of FIG. 2;

FIG. 7 illustrates a coding scheme for specifying respective call treatments noted in FIG. 5;

FIG. 8 illustrates one other way of specifying a call treatment;

DETAILED DESCRIPTION

Figure 1:
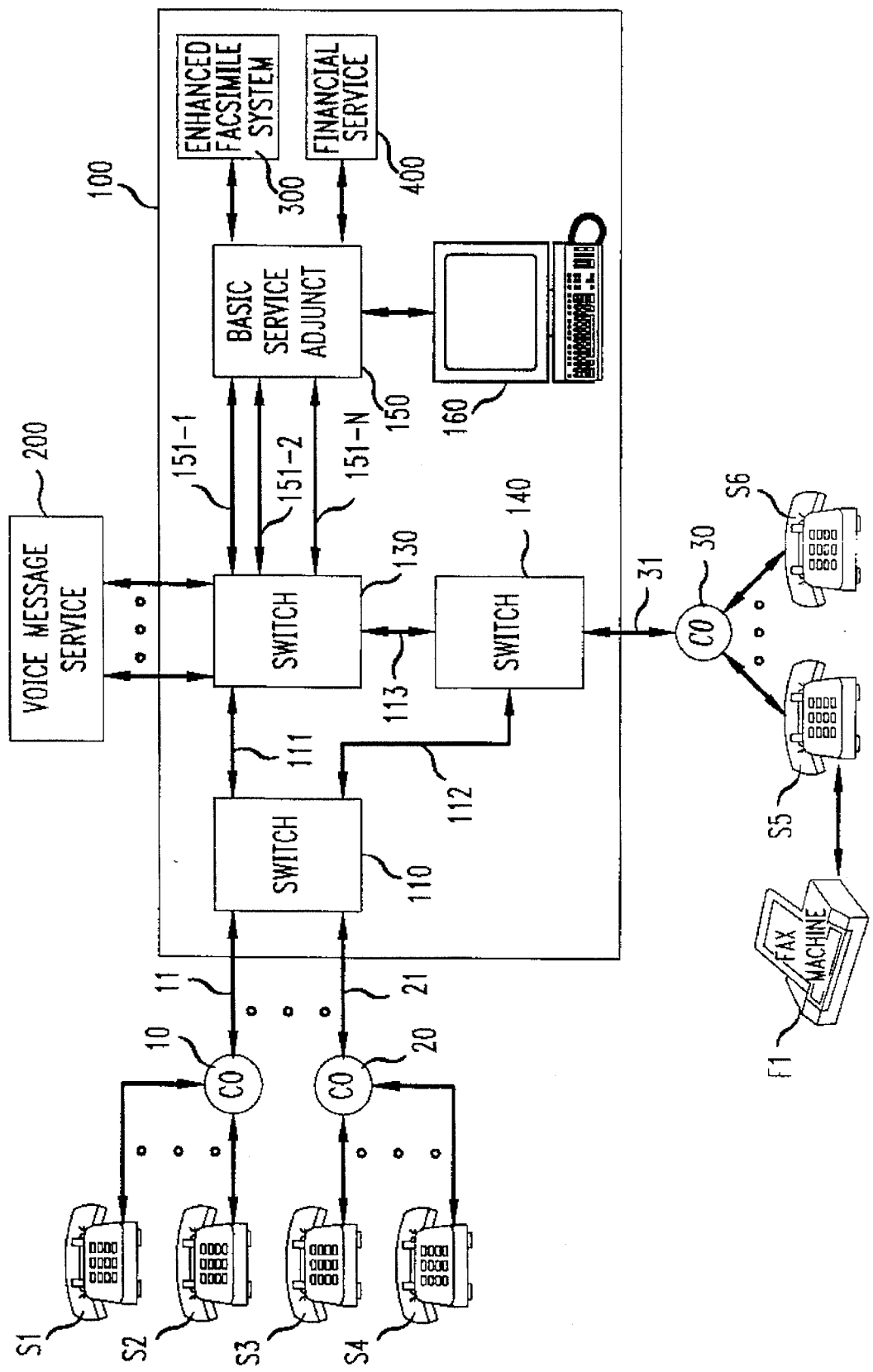
FIG. 1 is a broad block diagram of a communications network in which the principles of the invention may be practiced.

In an illustrative embodiment of the invention, communications network 100, FIG. 1, may be, for example, a public switched telephone network, such as, for example, the well-known AT&T network, that provides long distance telephone services for its subscribers, such as the subscribers associated with telephone stations S1 through S6. Network 100 includes, inter alia, a plurality of switching offices, three of which, 110, 130 and 140, are shown in the FIG. Such switches may be any one of the well-known types of switching equipment, and include, for example, the No. 4ESS (Electronic Switching System) and No. 5ESS available from AT&T. (4ESS and 5ESS are trademarks of AT&T). It is seen from the FIG. that each switch, e.g., switch 110, is connected to a number of other switches via a so-called inter-toll network, e.g., 111, 112, 113. A network switch may also be connected to a number of Central Offices (CO), e.g., COs 10 and 20. The operation of a central office is well-known and will not be discussed herein. However, it suffices to say that a CO is arranged to send to an associated switch of network 100 a telephone call originated at a calling telephone station set (herein the calling party), e.g., S1, which has dialed a particular long distance telephone number. A CO is also arranged to connect to a telephone station set (herein the called party), e.g., S4, a call that the CO receives from an associated network 100 switch.

Included in network 100 is service adjunct 150 which operates, in accord with the invention, to process a call associated with one of its subscribers in a manner prescribed by that subscriber, as will be explained below. Associated with adjunct 150 is a voice message service 200 which is external to network 200, but which connects thereto via switch 130. Voice message service 200 may be a conventional voice messaging service that is designed to receive from a calling party via adjunct 150 and network 100 a voice message that is "addressed" to a party who has subscribed to the inventive service as well as message service 200. That is, when a called subscriber does not "answer" a call directed to his/her station set via adjunct 150, then adjunct 150 may transfer the calling party to voice message service 200 so that the calling party may store a voice message addressed to the called subscriber in service 200.

Briefly, upon being connected to service 200 via adjunct 150 and at the direction of a service 200 voice announcement, the calling party may enter a voice message. Service 200, in a conventional manner, stores the voice message in its internal memory at a location that is associated with the called subscriber. Thereafter, the called subscriber may "dial up" service 200 via adjunct 150 and, when requested to do so, enter a so-called Personal Identification Number (PIN), or a password. Service 200, responsive to receipt of the PIN, unloads from its internal memory the voice message and transmits the message to the called party's station set via a network 100 connection established between the subscriber's station set and service 200.

A telephone user may subscribe to the inventive service by dialing a predetermined telephone number, e.g., 1-800-555-1000, associated with adjunct 150. Network 100, responsive to receipt of those digits, establishes a connection (not shown) to terminal 160 attended by a service representative. As a result of interacting with the representative, the new subscriber is assigned a unique telephone service number that is one of a predetermined range of telephone numbers (e.g., the range from xxx-xxxx to yyy-yyyy). In an illustrative embodiment of the invention, each such unique telephone number employed by the inventive personalized calling service is prefixed by a particular long distance telephone code—illustratively 700. Such a unique telephone number, in accordance with an aspect of the invention, is permanently assigned to a subscriber (user) as long as he/she subscribes to the personalized calling service. What this means is that the assigned number will not change even though the subscriber's local exchange telephone number, e.g., 201-555-6008, changes as a result of the subscriber relocating to an area that is served by another CO. In this sense, then, the assigned personalized calling service telephone number "travels" with the subscriber as he/she relocates from one area to another area of the country. Advantageously, then, a subscriber may selectively identify as his/her telephone number the assigned personalized calling service telephone number, rather than the subscriber's current local exchange telephone number and associated area code.

The subscriber is also assigned a Personal Identification Number (PIN), a security code, a number of Caller Identification Numbers (CIN) and a number of Secondary CINs (SCIN). As will be discussed below, a subscriber may define, in accord with an aspect of the invention, different call treatments for different ones of the subscriber's associated CINs and SCINs. In accord with another aspect of the invention, the subscriber may associate different billing modes with different call identifiers (CIs), i.e., CINs and SCINs, such that an originator of a call and associated with a first type of call identifier, e.g., a particular SCIN, pays for the call, whereas the subscriber pays for a call associated with a second type of call identifier, e.g., a particular CIN. The subscriber, on the other hand, is not billed for a call associated with a SCIN, as will be discussed below. In accord with another aspect of the invention, a subscriber's PIN, CINs, and SCINs may be distinguished from one another by the number of digits forming these identifiers, for example, five, four and three digits, respectively.

As a further result of such interaction, the service representative positioned at terminal 160 causes a data record defining the new subscriber's subscription to be stored in memory internal to adjunct 150. An illustrative example of a subscriber data record 300 is shown in FIG. 2, in which one or more of the fields define a particular aspect of the inventive service as follows:

PHONE.NUM—defines the unique subscription telephone number, e.g., 700-555-2234, assigned to the associated subscriber;

DEFLT.SVC—defines the default services available to the associated subscriber;

SUB.PIN—defines the PIN number assigned to the associated subscriber and may further define an associated second subscriber PIN number;

SEC.CODE—defines a unique security code assigned to the associated subscriber;

M.MASK—defines the subscriber's subscription of services;

SUB.LANG—identifies a particular language spoken by the subscriber, in which a default language is English;

HOME.PHONE—defines the subscriber's home telephone number;

NUM.CIN—defines the number of CINs assigned to the associated subscriber;

NUM.MSG—defines the number of voice messages stored in voice message service system 200 (FIG. 1) for the associated subscriber;

CFNUM.1–3—define respective call forwarding numbers when programmed by the subscriber;

CIN.1–4—define associated called identification number(s) and their respective call treatments as programmed by the subscriber;

SCIN.1–4—define associated secondary called identification number(s) and their respective call treatments as programmed by the subscriber;

NUM.SCIN—defines the number of associated secondary CINs;

PA.CALL—defines whether the subscriber will pay for all calls;

CW—defines a number of parameters associated with call waiting;

MED.PTR—indirectly points to a memory record containing personal medical information; and LNK.REC—defines the address of an associated or secondary subscriber record.

Of the various fields forming a subscriber record, the SUB.PIN 301, CF.NUM 302, CIN 303 and CW 304 fields are formed from a number of subfields as shown in FIGS. 3, 4, 5 and 6, respectively. Referring to FIG. 3 first, the SUB.PIN field includes a S.PIN subfield for storing the subscriber's PIN and a SS.PIN subfield for storing the subscriber's secondary PIN, if any. The latter PIN is used in the case where a number of subscribers, e.g., a husband and wife, are sharing the same service telephone number. If a secondary PIN is stored in the SS.PIN subfield, then the address of the subscriber record associated with that PIN is stored in the LNK.REC field of the subscriber record, as mentioned above.

Turning now to FIG. 4, each of the CF.NUM fields includes a CF.NUM subfield for storing a respective call forwarding telephone number and a CF.DUR subfield for specifying a period of time during which certain telephone calls will be forwarded to that telephone number. The start time for that period of time is specified in the associated CF.TIME subfield.

Turning now to FIG. 5, each of the CIN.1–4 fields includes CIN.NUM CIN.NAME and CIN.GTNG subfields for respectively storing a caller identification number, an associated name and a unique greeting that are defined by the subscriber. Each such field also includes a number of call treatment (CT) subfields for defining, in accord with an aspect of the invention, the call treatment(s) that may be accorded to the associated CIN, as will be explained below. (It is noted that SCIN.1–4 fields are similarly constructed.) Accordingly, the subscriber may specify (personalize) particular call treatments that adjunct 150 will use in the processing of particular calls placed to the subscriber's service number, as will be discussed below.

The subscriber may also personalize a conventional Call Waiting (CW) feature implemented by adjunct 150. To that end, CW field 304, FIG. 6, is effectively formed from a number of subfields such that the subscriber may respectively tie call waiting to (a) a particular telephone number (CW.NUM), (b) all of the subscriber's CINs and SCINs (ALL.CIN) or (c) a particular CIN or SCIN (CIN.NUM). For example, assume that the subscriber had programmed subfield CW.NUM so that it contains a particular telephone number. Also assume that the subscriber's home station set is busy as a result of a first call placed thereto via adjunct 150 and adjunct 150 then receives a second incoming call directed to the subscriber's service number. Adjunct 150, in response to the second call and the busy condition, compares the contents of subfield CW.NUM with the telephone number associated with the second incoming call (i.e., so-called ANI). If the comparison turns out to be true, then adjunct 150 waits for a pause to occur in the conversation between the subscriber and party involved in the first call. When adjunct 150 detects such a pause, it then momentarily interrupts the connection between the subscriber and first incoming call to advise the subscriber that the expected call is waiting. Adjunct 150 then advises the second caller that the subscriber has been alerted to the call waiting condition, and then pauses for a predetermined amount of time, e.g., five seconds. If the subscriber terminates the first call before the end of the pause, then adjunct 150 interconnects the second call so the connection established between adjunct 150 and the subscriber's home (or call forwarding) telephone station.

If the aforementioned comparison turns out to be false or the subscriber does not terminate the first call, then adjunct 150 may invite the second caller to leave a voice message for the subscriber on voice message service 200 (FIG. 1), as discussed above. (It is noted that the enhanced call waiting feature would be similarly processed if the subscriber had programmed either the ALL.CIN or CIN.NUM subfield, rather than the CW.NUM field.)

Once a telephone user, e.g., the telephone user associated with station S5, has subscribed to the inventive service, then he/she may thereafter interact with adjunct 150 and customize his/her associated record 300 to (a) invoke particular calling features, (b) change the values of one more of the assigned CINs and/or SCINs, or (c) change various call treatments associated with one or more CINs and/or SCINs.

Referring now to FIGS. 1 and 2, a subscriber may customize such calling features by dialing his/her service number, e.g., 700-555-2234, to establish a network 100 connection to adjunct 150. In doing so, network 100, i.e., switch 130, in a conventional manner, pauses to adjunct 150 the calling and called telephone numbers. Responsive to the connection and receipt of those numbers, adjunct 150 translates the called service number into a memory location and unloads from its internal memory the data record 300 associated with the called service number. (Hereinafter the latter data record will also be referred to as the primary data record.) Adjunct 150 then prompts the calling party (subscriber in this instance) to enter a caller identifier, i.e., CIN, SCIN or subscriber PIN. In the present illustrative example, the station S5 calling subscriber enters, via the associated station set keypad, his/her assigned PIN. Adjunct 150, responsive to receipt thereof, compares the value of the received PIN with the value of the PIN contained in the associated primary data record. In this instance, adjunct 150 would find that the former and latter values compare with one another and therefore returns to the calling subscriber a prerecorded announcement listing a number of calling features that the subscriber may access and/or customize.

(It is noted that if a number of subscribers share the aforementioned subscriber telephone number and the above comparison fails, then adjunct 150 compares the value of the received PIN with the value stored in the SS.PIN subfield of the primary data record. If those values compare with one another, then adjunct 150 processes the call in accord with the second subscriber data record ("secondary data record") whose memory location is identified by the contents of the primary record LNK.REC field. Since the functionality of the primary and secondary subscriber data records are virtually the same, a discussion of the principles of the invention in the context of the former record equally pertains to the latter record. As such, the following discussion will be given in the context of the subscriber's primary data record.)

An illustrative example of the forementioned calling features announcement may be formatted as follows:

"Welcome to the personalized service system. (1)
To hear your voice messages -- press one,
for call forwarding -- press two,
to call home or place a call -- press three,
to access your calling identification numbers -- press four,
for bulletin board service -- press five, or
to access enhanced services -- press six."

(It is noted that if the SUB.LANG field of the associated subscriber record identifies a language other than English, then announcement (1), the following subscriber announcements and prompts are transmitted in the identified language.)

Assuming that the subscriber, responsive to announcement 1, enters the digit one by pressing the corresponding keypad button of station set S5, then adjunct 150, responsive to receipt of a tone defining that number, unloads the contents of the NUM.MSG field of the associated record. If the contents of that field equals zero, then adjunct 150 transmits a message indicative of that fact to the calling subscriber.

If the value of the contents of the NUM.MSG field is greater than zero, then adjunct 150 returns a message reciting the contents of the latter field and an invitation to access the stored messages.

If the subscriber declines that invitation by entering, for example, the digit zero via the associated station set keypad, then adjunct 150, responsive thereto, retransmits announcement 1 to the calling subscriber. Alternatively, adjunct 150, responsive to receipt of another digit, e.g., the digit one, establishes a connection to switch 130 and outpulses the telephone number assigned to voice message service 200. Switch 130, operating in a conventional manner, establishes a connection to service 200. Adjunct 150 then bridges the calling subscriber's connection to the connection extending to service 200. At that point, the subscriber may, in a conventional manner, interact with service 200 to hear voice messages that are addressed to the subscriber, as discussed above.

If, on the other hand, the calling subscriber desires to program the call forwarding feature and therefore in response to announcement (1) enters the digit two in the manner discussed above, the adjunct 150 responsive to receipt of a tone defining that digit returns via network 100 a prerecorded announcement detailing the various options that the subscriber may elect in connection with the call forwarding feature. An illustrative example of such an announcement may be formatted as follows:

> "To turn on call forwarding - press one,           (2)
> to review call forwarding - press two,
> to turn off call forwarding - press three, and
> to exit the call forwarding feature - press four.

Assuming that the subscriber, in response to announcement (2) enters the digit one, then adjunct 150 request entry of the duration that call forwarding is to be in effect in terms of hours. If the calling subscriber desires call forwarding for a duration of one hour, then he/she may enter, in a conventional manner, that value (i.e. 1) followed by the pound sign. If, on the other hand, the subscriber desires continuing call forwarding then he/she may enter just the pound (#) sign. Adjunct 150, in response thereto, stores the specified number of hours of a predetermined value—illustratively a negative value—, as the case may be, in the associated CF.DUR subfield. As will be seen below, adjunct 150 uses the stored value and the value stored in the CF.TIME field to confirm that call forwarding is in effect.

Following the foregoing, adjunct 150 then requests entry of the call forwarding telephone number. An illustrative example of an announcement characterizing that request may be formatted as follows:

> "To forward calls to the telephone           (3)
> number you are calling from, press
> the pound sign; to forward calls to
> a different number, then enter the
> ten digit number, followed by the pound
> sign; to forward calls to your message
> service, then press six, followed by
> the pound sign."

Assuming that the calling subscriber selects the second of the announced options by entering a ten digit telephone number followed by the pound sign, then adjunct 150 stores the digits in a memory register in the order that they are received. (Alternatively, selection of the first or third of such options, causes adjunct 150 to respectively store in the memory register the calling telephone number that it initially received from switch 130, or a negative value.) Upon receipt of the pound sign adjunct 150 confirms the subscriber's selections by returning an announcement indicative thereof and presenting the subscriber with the option of changing either call forwarding number or duration, or canceling the call forwarding. If the subscriber does not cancel call forwarding then adjunct 150 respectively enters the received call forwarding number, specified duration and current date and time in the CF.NUM, CF.DUR and CF.TIME subfields forming the CFNUM.1 field of the associated record.

Adjunct 150 then presents the subscriber with the option of programming a next, or second, call forwarding number. If the subscriber selects that option, then the subscriber may similarly program the contents of the CFNUM.2 field, and then go on to program the CFNUM.3 field.

Alternatively, in response to announcement (2) the subscriber may elect to review the status of such call forwarding numbers by pressing the digit two on the associated telephone station keypad. Adjunct 150, in response thereto, transmits a verbal accounting of the contents of the CFNUM.1–3 fields. The subscriber, on the other hand, may cancel a priorly programmed call forwarding number by pressing the digit three. Adjunct 150, in response to receipt of the latter digit, transmits a review of each call forwarding number as well as an option to cancel the number.

Following the foregoing, adjunct 150 retransmits announcement 1, thereby presenting the subscriber with the opportunity to further personalize the inventive calling service.

As discussed above, the calling subscriber may place, via adjunct 150, a telephone call to his/her home, or some other location. The calling subscriber may do so by entering the digit three in response to announcement 1. Adjunct 150, in response to that selection, prompts the calling subscriber to determine whether the calling subscriber desires to place a call to his/her home or some other location.

Assuming that the calling subscriber elects to call another telephone number, then adjunct 150, responsive thereto, requests entry of the ten digit telephone number that the calling subscriber desires to call.

Assuming that the calling subscriber, responsive to the request, enters a ten digit number, for example the telephone number of 201-555-9876, then adjunct 150, stores the dialed digits forming that number in a memory register as they are received. Upon receipt of the last such digit, adjunct 150 then establishes a connection to switch 130 and outpulses the telephone number contained in the memory register. In addition, and as will be discussed below, adjunct 150 creates a billing record to track the time and charges for the associated call. Adjunct 150 then "bridges" the subscriber's inbound connection to the outbound connection between adjunct 150 and switch 130. In a conventional manner, switch 130 causes the aforementioned connection to be extended to the local CO, e.g., CO 20, serving the called telephone station set, e.g., S3, identified by the outpulsed telephone number. If CO 20 finds that station S3 is in a busy state (i.e., off-hook), then, CO 20 returns busy tone over the established connection. Assuming that is not the case, then CO 20 applies a ringing signal to the telephone line connected to called station S3. When the call is "answered", then the calling subscriber and answering party may begin to converse with one another over the bridged connections. When the parties end their conversation, then either party may terminate the established connection in a conventional manner, i.e, by placing their respective station sets in a so-called "on-hook" state. Alternatively, the calling subscriber may terminate the call by entering in the conventional way the pound sign (#) followed by the star sign (*). Adjunct 150, responsive to receipt of those signals, (a) terminates, in the conventional manner, the outbound connection to station S3, and (b) transmits announcement 1 to the calling subscriber.

In accord with an aspect of the invention, the subscriber is provided with the capability to interact with adjunct 150 for the purpose of administering the subscriber's CINs and/or SCINs. The subscriber may readily invoke that capability by entering the digit four in response to hearing announcement (1). Adjunct 150, in response thereto, presents the user with a number of different options relating to (a) adding, deleting, renaming and/or specifying, in accord with an aspect of the invention, the call treatments that are to be accorded to a respective caller identification number (CIN or SCIN) or (b) reviewing such numbers.

Specifically, if the subscriber elects to add a CIN or SCIN, then adjunct 150 requests entry of an identifier, for example, a four or three digit number, as the case may be. Upon receipt of the number, adjunct 150 transmits a verbal representation of the number to the subscriber as a way of confirming the subscriber's entry. Adjunct 150 then requests entry of the name that is to be associated with the received number. In an illustrative embodiment of the invention, a subscriber enters an alphabetic character by pressing respective keypad buttons on the associated station set in a well-known way. For example, to enter the name "Tom" the subscriber presses keypad buttons 8 and 1 for the "T" (first letter on button 8), buttons 6 and 3 for the "o" (third letter on button 6) and buttons 6 and 1 for the "m" (first letter on button 6). Responsive to the name entry, adjunct 150 transmits a verbal spelling thereof as a way of confirming the entry. Adjunct 150 then stores the entered CIN (SCIN) and associated name in an available CIN (SCIN) field of the subscriber's associated service record.

If, in the above example, the subscriber fails to start the entry of a name within a predetermined period of time, e.g., five seconds, then adjunct 150 assigns a default name to the newly added CIN or SCIN. In accord with an aspect of the invention, such a default name is selected based on the number of caller identification numbers that are contained in the subscriber's associated record. That is, if the number of CINs and SCINs in the record is eight, then a default name of "nine" may be assigned to the next CIN or SCIN that is added to record. If adjunct 150 makes such a default assignment, then adjunct 150 advises the subscriber of that fact by transmitting the default name to the subscriber. At that point, the subscriber may change the default name by entering a desired name in the manner described above.

Adjunct 150 then requests entry of an indication as to whether the CIN (SCIN) is to be associated with a unique greeting, which is presented to a caller who enters the associated identifier. If the subscriber's entry is positive (i.e., a two), then adjunct 150 requests entry of the subscriber's greeting for the associated identifier (CIN or SCIN). At that point, the subscriber may speak the greeting that he/she has composed for that identifier. As the subscriber does so, adjunct 150 digitizes the subscriber's received speech signals and stores the result in its internal memory. Adjunct 150 then stores the memory location containing the digitized greeting as well as a particular flag (e.g., -9999) noting the presence of the greeting in the associated CIN.GTNG subfield. Accordingly, when adjunct responds to an incoming call and the subsequent entry of an identifier (CIN or SCIN), then adjunct 150 unloads the associated CIN (SCIN) field. If adjunct 150 finds the aforementioned flag stored in the associated CIN.GTNG subfield, then adjunct 150 uses the remaining contents of the subfield to locate and unload the associated greeting from its internal memory. Adjunct 150 then causes the digitized greeting to be converted into an analog form and transmitted to the caller. Thus, in accord with an aspect of the invention, the subscriber may program different greetings for different identifiers (CINs and/or SCINs).

Adjunct 150 then requests entry of the call treatments for the newly added CIN or SCIN. Briefly referring to FIG. 7, there is shown an illustrative example of the various call treatments and associated codes that a subscriber may specify for a particular CIN or SCIN. For example, if the subscriber enters codes *1 and *5 in that order, then adjunct 150 stores those codes in respective CT subfields of the associated CIN (or SCIN) field. Thereafter, in response to an incoming call associated with the newly added CIN, adjunct 150 forwards the call to the subscriber's home telephone number as specified by the first call treatment *1. If the call is not answered, then adjunct 150 redirects the call to message service 200 as specified by call treatment *5. As another example, assume that the subscriber enters treatment codes *1, *4 and *6. Also assume that the call to the subscriber's home telephone number goes unanswered. In that event then, adjunct 150 redirects the call to the call forwarding number specified in the CFNUM.3 field of the associated record, as specified by treatment code *4. If the latter call is not answered, then adjunct 150 advises the calling party that the subscriber is not available, as specified by treatment *6. As a further example, assume that the subscriber enters treatment codes *2 and *5. Then adjunct 150 forwards the incoming call to the call forwarding number contained in the CFNUM.1 field of the associated record, as specified by treatment code *2. If that call is not answered, then adjunct 150 redirects the call to voice messaging service 200 as specified by treatment code *5. As a further example, assume that subscriber enters only treatment code *7, then adjunct 150 announces to the caller that the subscriber has a fax for the caller and that call is being forwarded to system 300. Adjunct 150 then forwards the call to system 300 so that the latter may download a facsimile to the caller's facsimile machine. Thus, in accord with an aspect of the invention, the subscriber is presented with the capability to specify different call treatments for different calling identifiers (CINs and/or SCINs).

If the subscriber elects to delete a CIN or SCIN and advises adjunct 150 thereof, then adjunct 150 requests entry of the caller identification number that is to be deleted and, for example, clears (sets to all zeroes) the associated CIN or SCIN field containing the entered number. If, on the other hand, the subscriber elects to rename a caller identification number (CIN or SCIN) then adjunct 150 requests entry of that number as well as its new name. The subscriber, in response to the request, enters the caller identification number in the conventional manner, i.e., by operating the appropriate keypad buttons. The subscriber then enters the new name in the manner described above. When the subscriber has entered the new name, then, as mentioned above, adjunct 150 transmits a verbal spelling of the name as a way of confirming the entry. Adjunct 150 then uses the entered number to identify the corresponding CIN or SCIN field of the associated record and stores the newly entered name in the NAME subfield of the identified field.

At any point during such administration the subscriber may request to review his/her "list" of CINs and SCINs by entering a predetermined keypad digit, e.g, the digit five (which is representative of the letter L (List)). Adjunct 150, responsive to receipt of that request, transmits a verbal representation of the contents of the CIN.NAME subfield and then the contents of the CIN.NUM subfield of field CIN.1 to the subscriber. Adjunct 150 then presents the subscriber with the option of either changing the call treatments specified for the announced caller identification number or "skipping" to the next such number. If the subscriber elects the former option, then the subscriber may enter a new series of called treatment code (e.g., *1, *2, *3 and *5) for the announced CIN (or SCIN). Adjunct 150, in response thereto, stores the received codes in respective CT subfields of the identified field. Adjunct 150 then goes on to identify the next CIN or SCIN field. Adjunct 150 proceeds in foregoing manner with respect to each of the subscriber's CINs and SCINs (e.g., field CIN.2 through SCIN.N (not shown)) and then announces when it has reached the end of the list.

(In an alternative embodiment of the invention, each CF.NUM field 302 (FIG. 4) may be expanded to include the subfields shown in FIG. 8 as way of basing call treatment on a call forwarding number. In particular, CSTEL.NUM,ALL-.CIN, and CF.CIN1 through CF.CIN3 subfields may be used to tie the associated call forwarding number (CF.NUM subfield) to (a) a particular telephone number, (b) all called identification numbers, or (c) one or more caller identification numbers, respectively.)

From time to time, the subscriber might find it desirable to pay for all calls placed to the subscriber's service number regardless of whether or not a caller enters a CIN in response to an adjunct 150 request. More specifically, following the administration of the subscriber's CINs and SCINs discussed above, adjunct 150 presents to the subscriber the option of invoking a "pay all calls" mode, during which the subscriber pays for all calls placed to his/her service number. The subscriber may select that option by pressing a predetermined sequence of station set S1 keypad buttons, e.g., the star (*) and pound (#) buttons. Adjunct 150, in response thereto, inserts a predetermined value, e.g., -9999, in the PA.CALL field of the associated record. Thereafter, in response to receipt of calls directed to the subscriber's service number, adjunct 150 charges the call to the subscriber as a result of finding that the associated PA.CALL field contains the aforementioned predetermined value.

Alternatively, the subscriber may decline to invoke the offered option by either terminating the call or entering a predetermined digit, e.g., the digit seven, via the station set S1 keypad as a way of entering a request to return to announcement (1). Adjunct 150, in response to such termination, clears the PA.CALL field the associated record and then terminates the call. Adjunct 150, in response to receipt of the digit seven, clears the P.ACALL field and then retransmits announcement (1).

As an aspect of the invention, the subscriber may limit the effectiveness of the pay-all-calls mode to a duration of time defined by the subscriber. That is, after selecting that mode, the subscriber may then enter a duration at the request of adjunct 150, in which the duration is specified as particular units of time, e.g., units of one hour each unit. For example, in response to an adjunct 150 request the subscriber may enter the digit two to limit the duration of the pay-all-calls mode to two hours. Adjunct 150, in response to receipt of the digit, stores the current date and time, the value of two and aforementioned predetermined value in the PA.CALL field of the associated record. Adjunct 150 thereafter clears the contents of that field during the processing of a call placed to the subscriber's service number subsequent to the expiration of the two-hour duration.

From time to time a person may have an urgent need to access immediately particular personal medication information. Such information may include, e.g., blood type, blood pressure readings, identities of drugs that the person is allergic to, identities of drugs prescribed currently and in the past, the results of the most recent and possibly prior electrocardiograms, etc. It is often the case that such information is usually kept in either a doctor's office, hospital, or both, that is, a location that is not readily accessible by the person. Such a person may, however, maintain their own hard copy of such information. Advantageously, if the person has access to a computer, e.g., a personal computer, then he/she may create and maintain a computer data record containing such medical information. However, except for subscribers of the inventive personalized telephone service, most people do not have access to a computer for the purpose of creating their own medical data record.

That is, a subscriber e.g., the subscriber associated with station set S1, at the time of subscribing to the inventive service, or thereafter, may also interact with the terminal 160 attendant for the purpose of creating their own medical data record, which record is stored in memory internal to adjunct 150. Specifically, during such interaction, the subscriber supplies his/her medical information that is to be stored in the associated medical data record to the terminal 160 attendant. The attendant, in turn, directs adjunct 150 to create a medical data record and associate that record with the subscriber's service record. The attendant then enters such medical information in terminal 160 as it is received from the subscriber for delivery to adjunct 150. Adjunct 150, in response to receipt of the information, stores it in the associated medical record. In addition, adjunct 150 stores the memory address of that record in the MED.PTR field of the associated subscriber record. Thereafter, the subscriber may place a call to adjunct 150 to access his/her associated medical record for the purpose of obtaining particular medical information or updating the record.

As mentioned above, if the subscriber does not answer a call placed via adjunct 150, then the calling party is given the option of leaving a voice message for the subscriber on voice message service 200 (FIG. 1). A calling party associated with a caller identification number (CIN) may also leave a brief replay message with a so-called "bulletin board" service provided by adjunct 150. The subscriber, more particularly, may access the bulletin board service by entering the digit six in response to hearing menu announcement (1) or electing to leave a reply message in response to hearing a bulletin board message. Accordingly, the bulletin board service provides, in accord with an aspect of the invention, a means for the subscriber and callers associated with respective ones of the subscriber's CINs to exchange brief voice messages, which is unlike voice messaging service 200 which allows only its subscribers to receive voice messages.

Specifically, the exchange of bulletin board messages is typically initiated by the subscriber entering the digit six in response to announcement (1). Adjunct 150, in response thereto, requests entry of the CIN that is to receive the bulletin board message. Upon receipt of that CIN, adjunct 150 then requests entry of a brief message, e.g., a message comprising no more than 15 words and numbers, and digitizes them in a conventional manner as they are received for storage in an associated bulletin board memory. The subscriber (or caller) signals the end of the message by pressing, for example, the pound sign on the keypad of the associated station set, e.g., station set S1. Adjunct 150, in response to the receipt of the latter signal, forms a message header including, inter alia, (a) the data and time, (b) subscriber's service number, (c) sender's PIN and (d) receiver's CIN. Adjunct 150 then stores the message and associated header in an available bulletin board memory location, in which each such location is sized to accommodate the message and associated header. Adjunct 150 then stores the address containing the subscriber's message and intended receiver's PIN/CIN in a record associated with the subscriber's service number. That is, the latter record may be one record of a conventional linked list of such records, each pointing to respective bulletin board messages in which the address of the first such record in the list is indirectly identified by subscriber's service number.

Thereafter, adjunct 150, in response to receipt of a call directed to the subscriber's service number and entry of a PIN or CIN, indexes a bulletin board message index using called service number. If the indexed location contains zeroes, then adjunct 150 concludes that there are no bulletin board messages associated with that particular service number. Otherwise, adjunct 150 accesses the bulletin board record identified by the contents of the indexed location and compares the PIN/CIN contained therein with the received PIN/CIN. If the comparison is true, adjunct 150 unloads the contents of the message location identified by the accessed record, converts the digitized message into its equivalent analog form and transmits the result to the calling party. Adjunct 150 then delinks the accessed record from the linked list in a conventional manner. When the message has been transmitted, adjunct 150 then presents the calling party with the option of entering a brief reply. If that calling party selects the option, then adjunct 150 processes the received voice message and stores it in the manner discussed above, in which the message may be directed to the subscriber's PIN or an associated CIN.

If the above mentioned comparison turns out to be false, then adjunct 150 checks to see if the accessed record is linked to another such record. If not, then adjunct 150 concludes that there are no bulletin board messages associated with the received CIN/PIN. Otherwise, adjunct 150 accesses the next linked record and then proceeds in the manner discussed above.

As an aspect of the invention, the subscriber may access various enhanced services by entering the digit seven in response to hearing announcement (1). Such enhanced services may include, for example, an enhanced facsimile service 300 or financial service system 400 shown in FIG. 1. Such enhanced services may also include a language translation service in which an operator capable of translating a particular language into English and vice-versa may be interposed between a calling party and the subscriber for the purpose of performing such translation. Such enhanced services may further include a conventional text messaging service and a number of different types of information services, including financial service 400.

In particular, if the calling subscriber elects to access the enhanced facsimile service, then adjunct 150 extends the subscriber's incoming call connection to EFAX system 300, which may be, for example, the well-known Enhanced FAX (EFAX) service provided by AT&T. Briefly, EFAX 300 is a store and forward system which stores a received facsimile (FAX) addressed to the subscriber in an associated FAX mailbox. Specifically, the subscriber may access EFAX 300 by establishing a telephone connection thereto via adjunct 150 and entering an EFAX 300 password unique to the subscriber. At that point, the subscriber may interact with EFAX 300 for the purpose of either accessing his/her assigned FAX mailbox or sending a FAX.

If the subscriber desires to send a FAX, then EFAX 300 requests entry of the telephone number of the intended recipient. Upon receipt of the telephone number, EFAX 300 transmits a so-called carrier tone. The subscriber, in response to hearing that tone, connects his/her facsimile machine to the telephone connection in a conventional manner. The subscriber's facsimile machine, e.g., machine F1 (FIG. 1), and EFAX 300 then exchange various signals and protocols to establish a transmission rate and various operating procedures. When FAX machine F1 and EFAX 300 agree to a transmission rate and such procedure, then EFAX 300 requests transmission of the facsimile and stores the facsimile in its internal memory as it is being received. Thereafter, EFAX 300 places a call to the intended recipient and transmits the subscriber's facsimile thereto. A notable aspect of EFAX 300 is its ability to transmit a subscriber's facsimile to a number of recipients identified by the subscriber. That is, the subscriber may request a facsimile broadcast mode and enter the telephone number of each recipient that is to receive the subscriber's FAX. EFAX 300, in turn, establishes a connection to each such recipient and transmits the subscriber's facsimile thereto.

If, on the other hand, the subscriber desires to access his/her EFAX mail box, then EFAX 300 transmits the number of facsimiles contained in the mailbox, if any, and the respective telephone numbers of the senders thereof. Armed with that information, the subscriber may direct EFAX 300 to transmit all or individual ones of such facsimiles to facsimile machine F1.

Alternatively, if the subscriber elects to access financial services system 400 then adjunct 150 extends the subscriber's incoming call connection to system 400. System 400, in response to the connection, requests entry of a system 400 password that it unique to the subscriber. Upon receipt thereof, system 400 transmits various financial indicators relating to, e.g., particular stocks and bonds that are of interest to the subscriber. Thereafter, the subscriber may disconnect from system 400 by entering via the associated keypad the digit 7 and the star (*) sign. Adjunct 150, in response to receipt thereof, terminates the adjunct 150 connection between the system 400 and the subscriber's incoming call connection and retransmits announcement (1).

Figure 9:
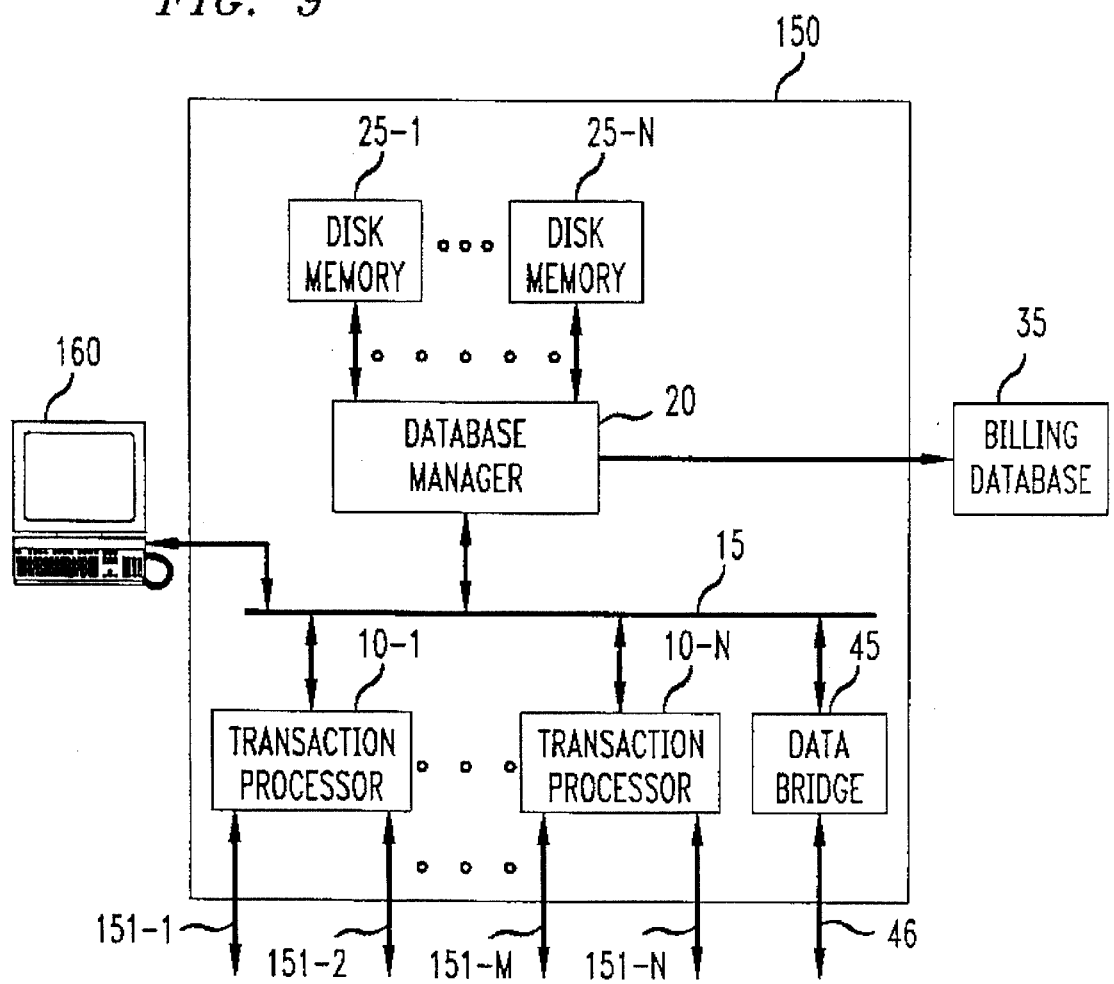
FIG. 9 is an illustrative embodiment of the basic service adjunct shown in FIG. 1.
Figure 14:
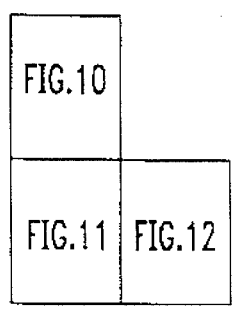
FIG. 14 shows the manner in which FIGS. 10–12 should be arranged with respect to one another.
Figure 10:
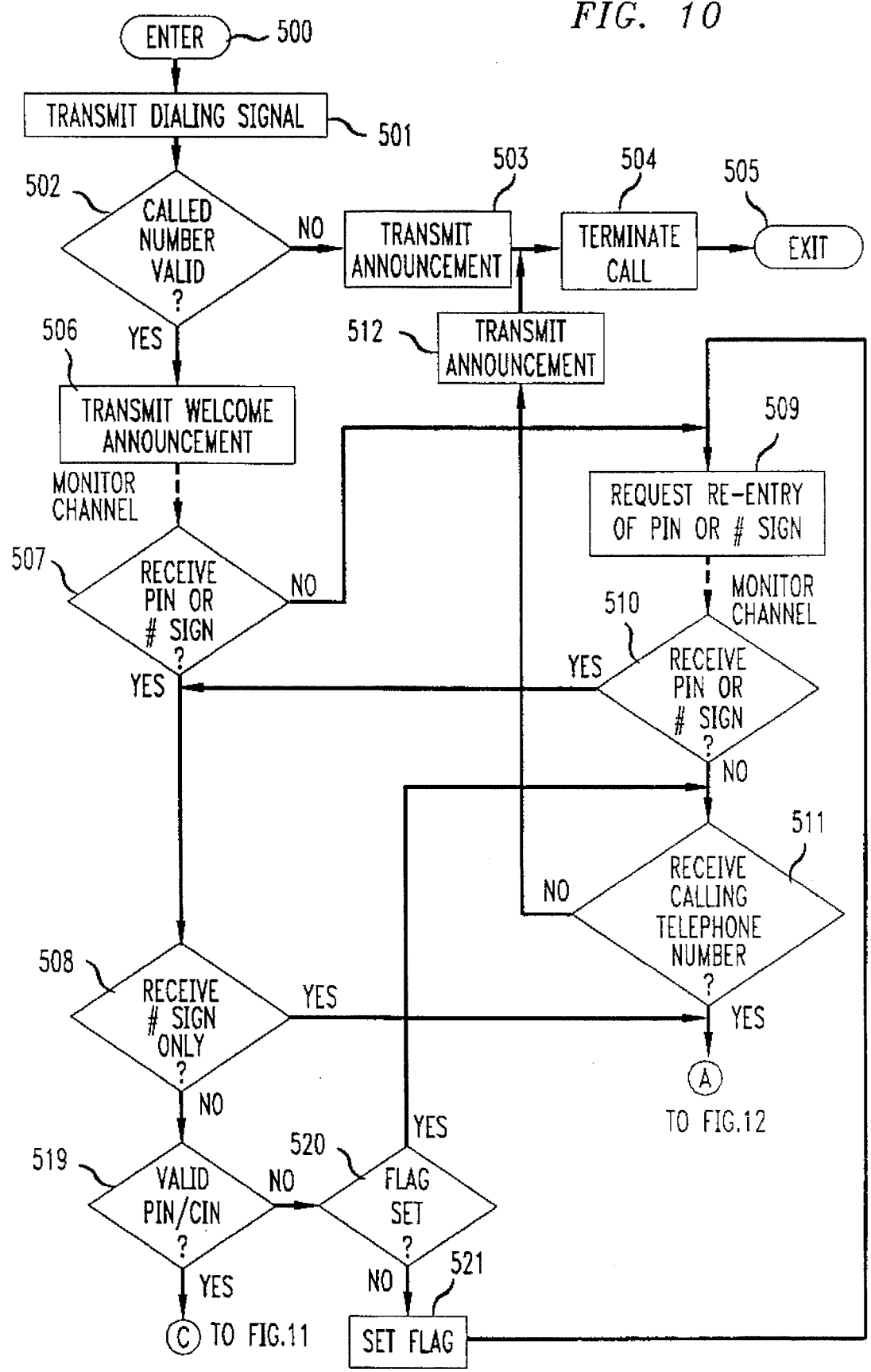
FIGS. 10–12 show in flow chart form the software program which implements the invention in the adjunct of FIG. 1.
Figure 11:
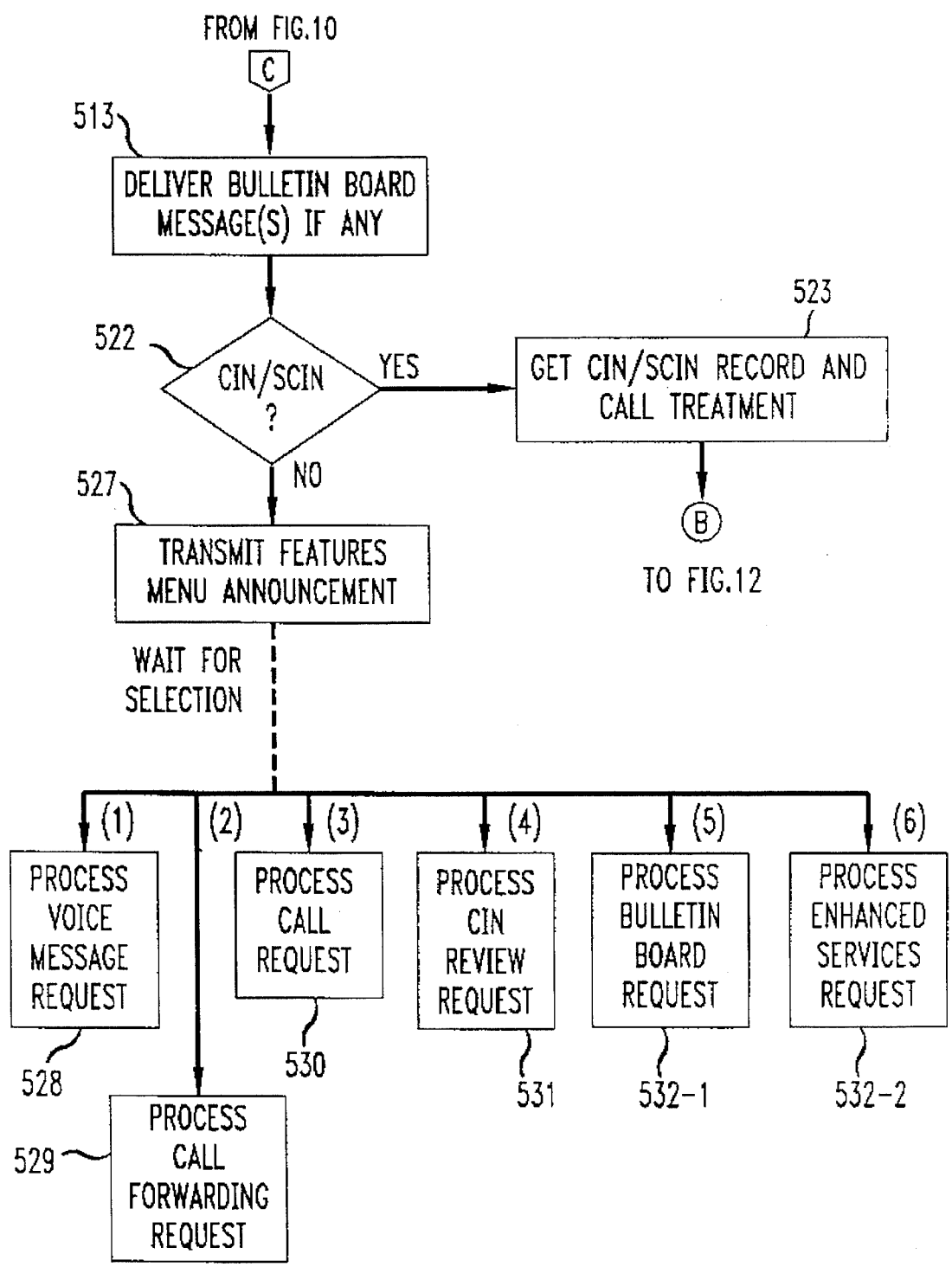
Figure 12:
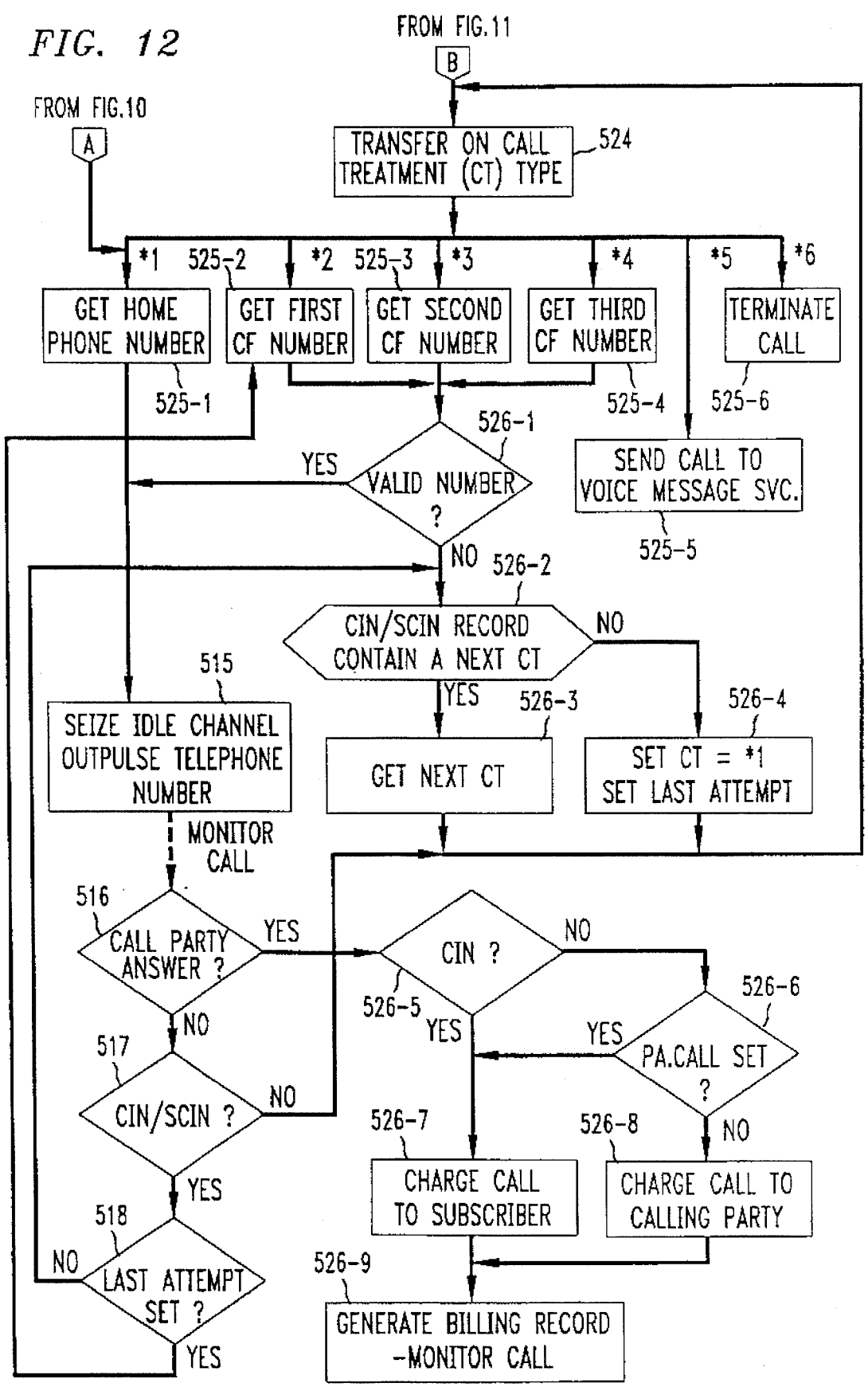

Turning now to FIG. 9, it is seen that adjunct 150 includes a number of transaction processors 10-1 through 10-N, each operating in conjunction with database manager 20 to implement the inventive service. In an exemplary embodiment of the invention, each of the transaction processors 10 may be, for example, the well-known Conversant voice information system that is available from AT&T.

Each processor 10 includes a so-called 6386 work group station (not shown) which controls the overall operation of its associated processor 10 and provides standard system services, such as real time clock, memory control, and interrupt handling. The work group station also provides interactions with the keyboard and display of terminal 160, and communicates with associated peripherals via a so-called AT bus. These peripherals (not shown) include RAM, a hard disk, LAN interface as well as various other peripherals. The other peripherals include digital network interface circuits and signal processing circuits for interfacing the associated transaction processor 10 with network 100 via respective ones of the communications paths 151-1 through 151-N.

Each network interface provides a so-called primary rate ISDN digital interface between adjunct 150 and a network switch, such as switch 130 (FIG. 1). As is well-known, a primary ISDN rate interface includes 23 communications channels and one signaling channel, in which each of the 23 channels is operative for establishing a connection, incoming or outgoing, between a switch and adjunct 150. Thus, each of the communications paths 150-1 through 150-N represents a respective primary rate 24 channel circuit between adjunct 150 and network 100.

Communications between one adjunct 150 and another adjunct 150 may be established via data bridge 45 connected to bus 15 and a so-called wide area network represented by path 46. Such communications may include changes in a subscriber record that occur as a result of the respective subscriber customizing his/her associated service record. Such communications also include a new subscriber record. Thus, each adjunct 150 that may be disposed in network 100 maintains an up-to-date copy of each subscriber record.

The progression of a call established under the direction of a transaction processor 10, as well as a call received thereat via a channel associated with a respective one of the communications paths 151, is monitored by an associated signal processing circuit operating under the control of an application software program. Such application software implements the inventive service within transaction processor 10 in the manner discussed above, and operates under the control of the well-known UNIX operating system.

Such application software may be readily implemented (customized) using any one of a number of different programming languages, for example, using the so-called Script Builder software provided by the aforementioned Conversant voice interactive system. The latter software allows a user to define the sequences of the application software in terms of menus and in a form specifying the interactions between adjunct 150 and incoming calls as well as outgoing calls. Such interactions include, for example, (a) answering an incoming call, (b) establishing an outgoing call, (c) prompting and collecting caller input, and (d) reading associated data and making logical conclusions, in the manner discussed above. A particular strength of such Script software is that it allows such interactions to be individually invoked for each of the aforementioned transmission channels.

Database manager 20 and associated high density memory disks 25 may be of the well-known type, such as the database manager and disks forming the StarServer FT system that is also available from AT&T. In particular, manager 20 is a fault tolerant computer and includes three Center Processing Units (CPU) each operating under the control of the aforementioned Unix operating system. Such CPUs operate independent of one another in executing the same stream of instructions contained in their respective cache and onboard memories. The CPUs output to an associated voting circuit their respective results obtained from executing such instructions. If the output of one CPU is different from that outputted by the other two, then the voting unit ignores the output received from the one CPU and accepts the output received from the other two CPUs. In most instances, the accepted output is a response to a database query received from one of the transaction processors 10 via bus 15.

Typically, a database query involves a subscriber record. The aforementioned application software may issue a number of such queries over the course of processing an incoming (inbound) call or establishing an outgoing (outbound) call. In an illustrative embodiment of the invention, subscriber records are stored in one of the disks 25, e.g., disk 25-1, whereas the associated CINs and bulletin board messages may be stored in another one of the disks 25, e.g., disk 25-N.

With the foregoing in mind, we now turn to a discussion of the way in which the inventive system processes particular types of telephone calls in accord with a respective subscriber data record. In doing so, it is assumed that the station S1 user is a subscriber of the inventive system and has subscribed to all of the above-mentioned calling features. It is also assumed that the station S1 subscriber is assigned (a) a PIN equal to, for example, 98765, (b) a subscription telephone number of, for example, 700-555-2234, (c) a group of CINs respectively equal to, for example, 4201 through 4204 and (d) at least one SCIN having a value of, for example, 901. It is further assumed that the station S1 subscriber (hereinafter "Subscriber") has given CIN 4204 to the user associated with station set S5 and has given SCIN 901 to the user associated with station set S4.

Specifically, and referring to FIGS. 1 and 9–12, if the user at station S1 places a telephone call by first causing station S1 to go off-hook and then dialing the subscriber's assigned telephone number of 700-555-2234, then, in that event, CO 10 upon receipt of the dialed digits establishes, via a conventional trunking arrangement, a connection between the station S1 telephone line and switch 110. CO 10 then passes to switch 110 the dialed digits (called number) and telephone number of the calling party, namely the station S1 telephone number including its associated area code (calling number). Switch 110, in turn, translates the dialed digits into a so-called destination switch number. In the present illustrative example, it is assumed that the destination switch number identifies switch 130. Accordingly, switch 110 extends the connection to switch 130 via the aforementioned intertoll network represented by path 111 and passes the called and calling telephone numbers to switch 130. Switch 130, in turn, translates the received called telephone number into a respective trunk group extending to a destination point. Typically, the destination point would be a local CO. However, in accord with an aspect of the invention, the destination point for the subscribed service is service adjunct 150.

Accordingly, switch 130 extends the connection to service adjunct 150 via one of the aforementioned primary rate channels. In doing so, switch 130 sends to adjunct 150 via the primary rate signalling channel associated with one of the paths 151, e.g., 151-1, a so-called call set-up message containing, inter alia, the called and calling numbers. Upon receipt of the message, the adjunct 150 application program (block 501) returns over the associated channel an alerting signal, e.g., a "bong" (alternatively, a ringing signal) to alert the calling party that the desired connection has been established. After a short duration of time, e.g., one second, the application program (hereinafter "program") removes the alerting signal from the channel.

The program (block 502) then forms a message containing the received called number (e.g., 700-555-2234) and a request to validate the number and sends the message to manager 20 via bus 15. Manager 20, in a conventional manner, determines the validity of the called service number by accessing the database of subscriber records to determine if a subscriber record has been assigned to the called number. If a subscriber record has been so assigned, then manager 20 transmits a message indicating that the called number if valid to the program via bus 15. Otherwise, the message indicates that the called number is not valid, which causes the program (block 503) to transmit over the path 151-1 channel an announcement indicating that the called number is not in service. The program (block 504) then terminates the call by transmitting a call termination message over the path 151-1 signaling channel. The program (block 505) then exits.

If the called number is valid, then the program (block 506) transmits a prerecorded "welcome" announcement requesting entry of a personal identification number over the associated channel. The following is an example of such announcement:

```
"Welcome to the personalized calling system.        (4)
If you are calling from a touch-tone telephone
and have a personal calling identification
number, please enter it now followed by the
pound sign. Otherwise, just press the pound sign."
```

The program then monitors, for a predetermined period of time, e.g., 10 seconds, the path 151-1 channel for receipt of a PIN or pound sign only. If, at the end of 10 seconds, the program (block 507) finds that it did not receive a PIN or pound sign only, then the program (block 509) transmits over the associated channel an announcement requesting that the calling party re-enter the personal identification number. Similarly, the program then waits for receipt of the requested information. If, at the end of the wait period (i.e., 10 seconds), the program (block 510) finds that it did not receive a PIN, CIN (SCIN) or pound sign only, then the program (block 511) checks to see if it received the calling party's telephone number from its associated network 100 switch. If that is the case, then the program obtains the subscriber's home telephone number (block 525-1) and then proceeds to establish a telephone call to that number (block 515), as will be discussed below. The program operates in a similar manner if its finds (block 508) that the calling party entered only the pound sign. If the program (block 511) finds that it did not receive the calling telephone, then the program (block 512) transmits a message indicating that the called number is not valid and then terminates the call (block 504).

If, on the other hand, the program (block 507) finds that the calling party responded to the welcome announcement, then the program (block 508) checks to see if that party entered just the pound (#) sign. If that is the case, then the program proceeds as mentioned above. If the calling party enters a CIN (e.g., 4204), SCIN (e.g., 901) or subscriber PIN (e.g., 98765), then the program (block 519) checks the validity of the entry. The program does this by sending to manager 20 via bus 15 a message containing, inter alia, the received entry, called telephone number and validation request. Manager 20, responsive to receipt of the message, determines if the entry contained in the message comprises three, four or five digits. If the entry comprises five digits, indicating that the entry is a subscriber PIN, then manager 20, in a conventional manner, compares the five digit number with the number contained in the SUB.PIN field of the subscriber's associated service record stored in disk memory, e.g., disk 25-1. If the numbers compare, then manager 20 returns to the program a message indicating that the entry is valid. Otherwise, manager 20 checks to see if the received PIN compares with an associated secondary pin (S.PIN). Assuming that an S.PIN is not present, then the manager 20 message indicates that the entry is invalid.

Similarly, if the entry comprises four (three) digits, indicating that the entry is a caller CIN (SCIN), then manager 20 compares the four (three) digit entry with the contents of each CIN (SCIN) field associated with the subscriber's record, and returns the appropriate validation message to the program. If the manager 20 message indicates that the entry is not valid, then the program (block 520) checks to see if it has a particular flag for the current call. If the flag is set, then the program (block 511) processes the call in the manner discussed above, If the flag is not set, then the program (block 521) sets the flag and then proceeds in the manner discussed above.

If the manager 20 message indicates that the entry is valid, then the program, operating in conjunction with manager 20 determines (block 513) if a bulletin board message is posted for the received identity number. If that is the case, then the program transmits the bulletin message to the calling party, and then transmits a query to determine if the calling party desires to enter a reply, as discussed above. Following the entry and storage of such a reply or finding that such a bulletin board message has not been posted, then the program (block 522) checks the entered identity number to determine if it contains three or four digits. If that is the case, then the program (523) gets a copy of the associated CIN (or SCIN) record, e.g., CIN.1 (SCIN.1) field. Upon obtaining a copy of the associated call identifier field (CIN/SCIN), the program then checks the associated CIN.GTNG subfield to see if it points to a customized greeting. If that is case, then the program causes the greeting to be transmitted to the caller in the manner discussed above. The program then unloads the first Call Treatment (CT) type and transfers on that type of call treatment (block 524). If that CT is *1, then the program via manager 20 gets a copy of the called subscriber's home telephone number (block 525-1). Armed with that number, the program (block 515) then notifies the calling party as to the destination of the call and an indication as to whether the calling party or subscriber will pay for the call. The program then presents the caller with the option of terminating the call or proceeding with the setting up of the call to the called telephone number. If the caller is being charged for the call and does not terminate the call, then the program presents the caller with the option of charging the call to either a credit or calling card or bridging an operator onto the call for billing purposes. Following the foregoing, the program then (a) seizes, in a conventional manner, an idle one of the communications channels associated with one of paths 151-1 through 151-N, for example, path 151-2, (b) bridges the inbound channel associated with the calling station to the seized channel, and (c) sends to switch 130 via the aforementioned signaling channel a so-called "call setup" message containing, inter alia, (i) a request to establish a connection, and (ii) the subscriber's home telephone number.

Network 100, in a conventional manner, establishes via switches 130 and 140 a connection between the seized path 151-2 channel (and thus adjunct 150) and CO 30 serving the called station, e.g. station S1. CO 30, responsive to receipt of the called telephone number from switch 140, then extends the connection to the telephone line serving station S1. CO 30 then supplies a ringing signal to the telephone line to alert the subscriber to the incoming call.

(It is noted that if the manager 20 message contained instead a call forwarding telephone number, then a telephone connection would be established to the CO serving the telephone station identified by the call forwarding number.) If the call is answered (block 516), then the program (block 526-5) determines if the call is associated with an entered CIN. If that is the case, then the program sets a flag indicating that the call will be charged to the called subscriber (block 526-7). Otherwise, the program via manager 20 determines if the pay-all calls (PA.CALL) indicator is set (block 526-6). If that is the case, then the program proceeds to block 526-7. Otherwise, the program sets the aforementioned flag to indicate that the calling party will be billed for the call (block 526-8). The program (block 526-9) then generates a conventional telephone billing record containing, inter alia, subscriber service number, S.PIN (or SS.PIN as the case may be), calling telephone number, and entered identity number, if any (i.e., CIN or SCIN, as well as the associated name), and the aforementioned flag indicating who is being billed for the call. The program also inserts in a START field of the associated billing record the current time of day and stores the billing record in local memory. Thereafter, the program monitors the status of the bridged connection to determine the point in time at which the calling or called party terminates the call. At that point, the program inserts in an END field of the associated billing record the current date and time of day. The program then sends the billing record to manager 20 via bus 15 for storage in billing database 35.

If the treatment type at block 524 happens to *2, *3 or *4, then the program (block 525-2, 525-3 or 525-4) obtains the corresponding call forwarding number. The program (block 526-1) then determines if the number is valid, i.e., is not zero or the associated duration specified for the number has not expired. If the number is valid, then the program (block 515) proceeds to place a call to that number, as discussed above. If the call forwarding number is not valid, then the program (block 526-2) determines if the associated CIN (or SCIN) record contains a next call treatment type. If that is the case, then the program (block 526-3) gets the next CT and then proceeds to transfer on that CT type (block 524). If the associated CIN (SCIN) record does not contain a next CT, then the program (block 526-4) sets a default CT to type *1 and sets a so-called "last attempt" flag to a value of one. The program (block 524) then transfers on the default CT.

If the program (block 516) determines that the call has not been answered, then the program (block 517) determines if the call is associated with a CIN/SCIN. If that is the case, then the program (block 518) determines if the last attempt flag is set. If it is, then the program sets a default CT to *5 and transfers (block 524) on that CT type as a way of of forwarding the call in the manner discussed above to voice message service 200 so that the caller may leave a voice message for the called subscriber. It is noted that the program does not normally proceed via block 518 and/or block 526-4 and does so only in the event that the associated CIN (or SCIN) record did not specify a CT type of *5 or *6 as a call treatment.

If the program (block 517) determines that the call is not associated with a CIN or SCIN, then the program sets a default CT to *6 and transfers (block 524) on that CT as a way of transmitting to the caller an announcement indicating that the subscriber is not available and then terminating the call in a conventional manner (block 526-6). If the program (block 518) finds that the last attempt flag is not set, then it determines (block 526-2) if the associated CIN (SCIN) record contains a next call treatment type and then proceeds in the manner discussed above.

If the program (block 516) finds that the called number is busy, then the program via manager 20 determines if call waiting is in effect. If it is, the program, in conjunction with manager 20, then determines if the CIN, SCIN or calling telephone number associated with the current call matches one of the call waiting values contained in respective ones of the subfields forming the CW field of the associated subscriber record. If that is found to be the case, then the program monitors the call for a pause in the conversation between the parties involved in that call. At the pause, the program transits a signal over the connection to the called subscriber to indicate that a call is waiting. If the waiting call is associated with a CIN or SCIN, then the program also transits the name associated therewith. The program then waits a predetermined period of time, e.g., five seconds, for that call to be terminated. During the wait period, the program causes a ringing tone to be transmitted over the waiting incoming call connection. If the prior call is terminated within the wait period, then the program establishes a connection between the called subscriber and the calling party. Otherwise, the program terminates the transmission of the ringing tone and offers the calling party the option of leaving a voice message for the called subscriber in the manner discussed above.

If the program (block 522) finds that the number entered by the caller contains five digits, then the program concludes that the calling party is the subscriber and transmits (block 527) announcement (1) to the subscriber via the path 151-1 channel. The program then waits for the subscriber's selection (entry). Upon receipt of the entry, the program proceeds to an appropriate sub-program (block 528, 529, 530, 531, 532-1 or 532-2) to process the subscriber's selection, in the manner discussed above.

Figure 13:
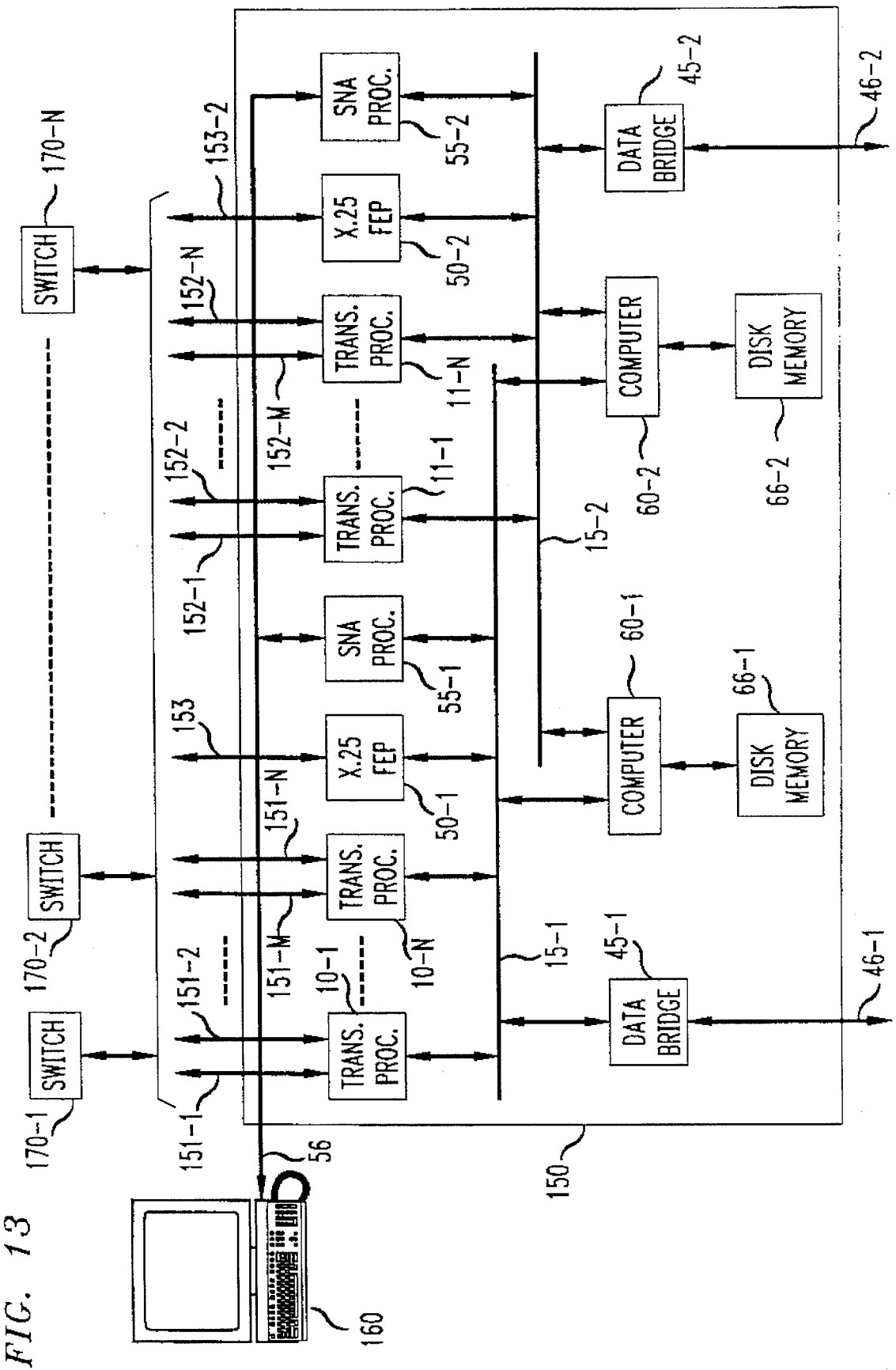
FIG. 13 is an illustrative alternative embodiment of the basic service adjunct shown in FIG. 1.

One possible preferred embodiment of adjunct 150 is shown in FIG. 13. It can be appreciated that FIG. 13 is somewhat similar to FIG. 9. Accordingly, components similar to those shown in FIG. 9 are similarly numbered in FIG. 13.

It is seen from FIG. 13 that adjunct 150 connects to a plurality of network 100 switches 170. In the illustrative alternative embodiment of adjunct 150, each such switch may be the well-known No. 5ESS Operator Service Position System (OSPS) switch available from AT&T. As is well-known, the No. 5ESS/OSPS provides operator services. As such, a call placed to a subscriber telephone number may be preceded by a long distance operator code, i.e., a so-called 0+ code.

To enhance its reliability, adjunct 150 is formed from two sections, in which a component in one such section is duplicated in the other such section. Accordingly, a discussion of one such section equally pertains to the other such section.

In particular, each such section includes a group of transaction processors 10 (11), in which associated communications paths, e.g., paths 151-1 and 151-2, connect a transaction processor, e.g., processor 10-1, to two of the switches 170. In an illustrative embodiment of the invention, each such communications path may be, for example, a so-called T1 carrier line. As is well-known, a T1 carrier line provides 24 channels for carrying a like number of calls. Each such section also includes an X.25 Front End Processor (FEP) 50, SNA processor 55, LAN 15, and a computer 60 associated with a disk memory 66. The X.25 FEP 50 implements the well-known X.25 data transmission protocol and is the means by which an associated section of the adjunct 150 exchanges call signaling information with a network switch 170. That is, X.25 FEP 50 is arranged so that it supplies to its associated computer 60 via LAN 15 call signaling information that FEP 50 receives from a respective one of the switches 170. Similarly, X.25 FEP 50 is arranged to supply to a respective one of the switches 170 call signaling information that FEP 50 receives from an associated computer 60 via LAN 15. In this respect, X.25 FEP 50 connects to each of the switches 170 that connect to associated section transaction processors. The connection between X.25 FEP 50 and such switches 170 is represented in the FIG. by cable 153.

The processing of incoming and outgoing calls and associated call information, as well as data base management of subscriber records stored in a disk memory 66, is handled by the associated computer 60, which may be, for example, the Digital Equipment Corporation VAX-9000. That is, computer 60 operates in accord with the program of FIGS. 10–12 as well as other programs. In this respect, computer 60 is at the heart of adjunct 150, whereas transaction processors 10 (11) and X.25 FEP 50 serve to interface their associated computer 60 with switches 170. In addition, and as a means of further improving the redundancy of adjunct 150, each computer 60 is connected to each LAN 15, as shown in the FIG.

As mentioned above, a new subscriber record is inputted by an attendant operating terminal 160. Terminal 160 connects to each section of adjunct 150 via a respective SNA processor 50. Each SNA processor 50 implements the well-known IBM SNA protocol, and is used to interface terminal 160 with a respective computer 60. Thus, a newly imputted subscriber record is passed to both computers 60 via their respective SNA processors 50 and LANs 15. Both of the computers 60, in turn, store the new record, or a change to an existing record, in their respective disk memories 66. A computer 60 may also receive from another adjunct 150 via the associated data bridge 45 a new subscriber record, or a change to an existing record. In this way, each adjunct 150 maintains an updated copy of each subscriber record, an mentioned above.

The foregoing is merely illustrative of the principles of the invention. Those skilled in the art will be able to devise numerous arrangements, which, although not explicitly shown or described herein, nevertheless embody those principles that are within the spirit and scope of the invention. In particular, the inventive personalized calling service and the versatility of the platform which supports that service may be readily adapted to include a number of additional features. For example, in accord with another aspect of the invention, a subscriber may be presented with the option of allowing a person assigned to a particular CIN to place an outbound call via adjunct 150, in which the charges for such a call are billed to the subscriber. That option may be readily invoked by, for example, coding it as a respective call treatment. Accordingly, when adjunct 150 encounters that call treatment it then offers the calling party the option of placing an outbound call. The calling party may accept that option by entering an expected predetermined value. As another example, and in accord with another aspect of the invention, the subscriber may control the placing of such outbound calls in a number of different ways. In particular, the call treatment could be arranged so that there is a limit placed on the duration of each such outbound call and/or the number of such calls that may be placed within a predetermined period of time, e.g., one month.

As another example, adjunct 150 may serve as an archive for files that the subscriber has stored on his/her personal computer. That is, the subscriber may place a call to adjunct 150 and enter a request for archive service. The subscriber, via the personal computer, may then communicate with that service for the purpose of up-loading particular personal computer files for storage in memory associated with the archive service. Such additional features may also include: speed dialing and three-way calling; recognizing spoken identifiers, request or spoken telephone numbers; providing interexchange operator services; international calling, both incoming and outgoing; providing foreign language services, in which the adjunct 150 announcements and requests are spoken in the language of the calling subscriber, or a person associated with a CIN or SCIN; storing a subscriber audio calendar or address book; providing the subscriber with the ability to request announcement 1 at the end of a call; giving a caller immediate credit for misdialed telephone numbers; providing access to sound impaired (hearing and/or speech-impaired) persons; providing a shopping or catalog service; providing a service that automatically places a call to a predetermined telephone number (location) at a predetermined time to verify the presence of a particular person at that location and placing a call to a specified telephone number and providing a signal indicative of the result of such verification; providing personal computer access and providing information services that such a computer may access to obtain particular information. Moreover, the aforementioned caller and personal identifiers could be any type of unique identifier, such as, for example, a voice print that may be verified using either speaker dependent or indepedent voice verification means, in which the identifier could be a name, number, word, etc. Also, the entry of a name associated with an identifier could be entered as a speech utterance in which the entered name is digitized and stored in the associated record. In addition, the aforementioned CINs and SCINs could be the same number of digits and distinguished from one another by the value of the leading digit. For example, the leading digit for CINs could be a one and the leading digit for SCINs could be a two.

We claim:

1. A communication system for providing personalized calling services comprising means for storing a caller identifier for each of a plurality of subscriber telephone numbers, means for answering a telephone call directed to a particular one of said subscriber telephone numbers, means, responsive to receiving a caller identifier after said telephone call has been answered, for prompting said caller to select one of a number of different personalized calling services, and means, responsive to receiving an indication that said caller has selected a particular one of said calling services, interacting with said caller for the purpose of receiving a telephone number identifying a destination of a facsimile, means, responsive to receipt of said telephone number, for transmitting a carrier tone to said caller, for then interacting with the caller's facsimile machine for the purpose of receiving a facsimile from said machine and for then retransmitting said facsimile to said destination.

2. A platform for providing personalized calling services, said platform being disposed in a telecommunications system and being associated with a plurality of different telephone numbers, said platform comprising means for storing a caller identifier for each of said telephone numbers, said caller identifier being associated with a selectable call treatment defined by a respective specification, means for answering a telephone call directed to one of said telephone numbers, means, responsive to receiving a caller identifier after said telephone call has been answered, for presenting to the caller in accordance with the specification associated with the received identifier a selectable option of sending a facsimile via said platform, and means, responsive to receipt of an indication that the caller has selected said option and responsive to receipt of a destination telephone number for a facsimile to be supplied by said caller, for then interacting with the caller's facsimile machine to receive said facsimile and for then retransmitting the received facsimile to the destination telephone number.

\* \* \* \* \*